United States Patent [19]

Hayes

[11] Patent Number: 4,932,982
[45] Date of Patent: Jun. 12, 1990

[54] COPOLYIMIDE GAS SEPARATION MEMBRANES DERIVED FROM SUBSTITUTED PHENYLENE DIAMINES AND SUBSTITUTED METHYLENE DIANILINES

[75] Inventor: Richard A. Hayes, Parkersburg, W. Va.

[73] Assignee: E. I. Du Pont de Nemours and Company, Wilmington, Del.

[21] Appl. No.: 360,044

[22] Filed: Jun. 1, 1989

[51] Int. Cl.$^5$ .............................................. B01D 53/22
[52] U.S. Cl. .......................................... 55/16; 55/68; 55/158
[58] Field of Search .............................. 55/16, 68, 158; 210/500.38, 500.39; 528/310, 329.1

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 55/16 X |
| 3,899,309 | 8/1975 | Hoehn et al. | 55/16 X |
| 4,156,597 | 5/1979 | Browall | 55/16 |
| 4,378,400 | 3/1983 | Makino et al. | 55/16 X |
| 4,528,004 | 7/1985 | Makino et al. | 55/158 |
| 4,690,873 | 9/1987 | Makino et al. | 55/16 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,830,640 | 5/1989 | Nakamura et al. | 55/16 X |
| 4,832,713 | 5/1989 | Yamada et al. | 55/158 |
| 4,838,900 | 6/1989 | Hayes | 55/16 |

FOREIGN PATENT DOCUMENTS

| | | | |
|---|---|---|---|
| 60-022902 | 2/1985 | Japan | 55/158 |
| 60-082103 | 5/1985 | Japan | 55/158 |
| 61-133117 | 6/1986 | Japan | 55/158 |
| 62-074410 | 4/1987 | Japan | 55/158 |
| 62-074411 | 4/1987 | Japan | 55/158 |
| 62-114628 | 5/1987 | Japan | 55/158 |
| 63-028424 | 2/1988 | Japan | 55/158 |
| 63-166415 | 7/1988 | Japan | 55/158 |
| 2098994 | 12/1982 | United Kingdom | 55/16 |

*Primary Examiner*—Robert Spitzer

[57] ABSTRACT

An aromatic copolyimide gas separation membrane and the process of using it to separate one or more gases from a mixture of gases are disclosed. The aromatic copolyimide is the condensation product of a aromatic tetracarboxylic dianhydride with a phenylene diamine and a methylene dianiline both of which diamines are substituted with alkyl groups on all positions ortho to the amino groups.

12 Claims, No Drawings

COPOLYIMIDE GAS SEPARATION MEMBRANES DERIVED FROM SUBSTITUTED PHENYLENE DIAMINES AND SUBSTITUTED METHYLENE DIANILINES

BACKGROUND OF THE INVENTION

1. Field of the Invention

The present invention relates to gas separation membranes formed from certain substituted aromatic polyimides having a rigid polymer chain and to the process of separating one or more gases from a mixture of gases.

2. Prior Art

U.S. Pat. No. 4,705,540 discloses rigid polyimide gas separation membranes prepared from alkyl-substituted phenylene diamines and structurally rigid aromatic dianhydrides. Membranes prepared from these materials were found to have exceptionally high gas permeation rates with moderate gas selectivities.

U.S. Pat. No. 4,717,394 discloses that a greater range of gas productivities can be achieved through the controlled incorporation of less chain rigidity than that found in U.S. Pat. No. 4,705,540. This was accomplished, in part, through the use of mixtures of alkyl-substituted phenylene diamines and essentially unsubstituted diamines. The incorporation of alkyl-substituted methylene bisanilines with alkyl-substituted phenylene diamines in the present invention enables an even greater range of gas productivities to be achieved.

Application Ser. No. 175,503 filed Apr. 13, 1988 now U.S. Pat. No. 4,838,900 discloses polyimide gas separation membranes prepared from substituted methylene bisanilines and aromatic tetracarboxylic dianhydrides. The incorporation of the more rigid alkyl-substituted phenylene diamines in accordance with the present invention allows for a greater range of gas productivities than found in Ser. No. 175,503.

U.S. Pat. No. Re. 30,351; U.S. Pat. Nos. 3,822,202; and U.S. Pat. No. 3,899,309 disclose gas separation membrane materials comprising certain semi-rigid aromatic polyimides, polyamides and polyesters.

SUMMARY OF THE INVENTION

The present invention relates to certain alkyl-substituted aromatic polyimide separation membranes particularly useful for separating gases and the process of using them. This class of polyimide membrane materials is compositionally prepared by condensation from mixtures of certain alkyl-substituted phenylene diamines and alkyl-substituted methylene dianilines with aromatic dianhydrides. Gas separation membranes formed from this class of polyimides have improved environmental stability and superior gas permeability. The range of gas permeation properties exhibited by them allows for the tailoring of membrane material for widely diverse gas separations. The high permeabilities of some gases from multicomponent mixtures is believed to be due to the optimization of the molecular free volume in the polymer.

The present invention relates to the discovery that aromatic polyimides prepared by polycondensation of aromatic tetracarboxylic dianhydrides with a mixture of phenylene diamines having substituents on all positions ortho to the amine functions and methylene dianilines having substituents on all positions ortho to the amine functions form membranes with exceptional gas permeability. These increases in productivity of these membranes are believed to be due to the high molecular free volume in the polymer structure resulting from the rigid nature of the rotationally hindered polyimide linkage.

Generally, extremely high gas permeation rates through dense polymeric membranes is found only with low glass transition temperature (Tg) materials, such as silicone rubbers and a few polyolefin polymers. The low Tg materials are generally only useful as the dense separating layer in composite membranes, where a supporting porous membranes substructure provides structural integrity.

High Tg polymeric materials, found in the prior art, which may possess high gas selectivities, suffer from low gas permeabilities. Examples reported involve mostly unsubstituted, or partially substituted, polymers subject to forming a close chain packing during fabrication and/or subsequent operation.

The present situation circumvents the above shortcomings and provides high gas productivity dense membranes using aromatic polyimides containing the repeating unit:

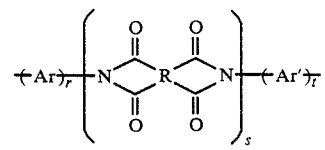

where —Ar— is

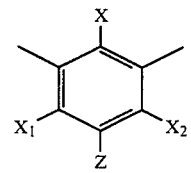

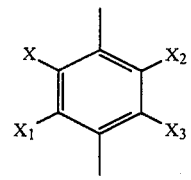

or mixtures thereof, —Ar'— is

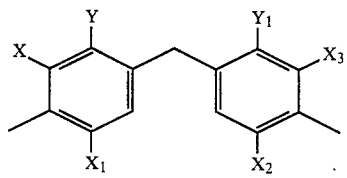

or mixtures thereof, is

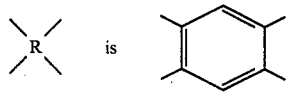

-continued

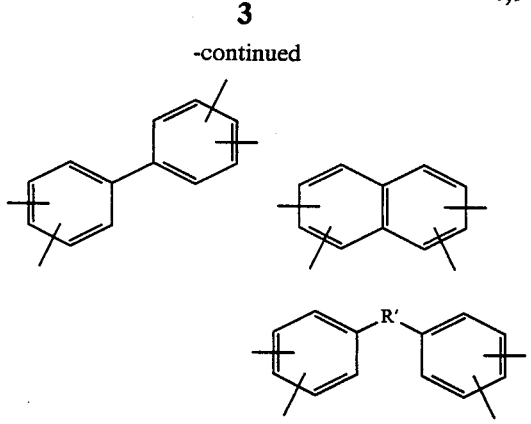

or mixtures thereof, —X, —X$_1$, —X$_2$ and —X$_3$ are independently primary or secondary alkyl groups having 1 to 6 carbon atoms preferably methyl, ethyl, or isopropyl, —Z is —H, —X, —X$_1$, —X$_2$, or —X$_3$ —Y is —Y$_1$ are independently —H, —X, —X$_1$, —X$_2$, —X$_3$ or halogen such as —F, —Br, —Cl, or —I, preferably —H or —Cl and —R'— is

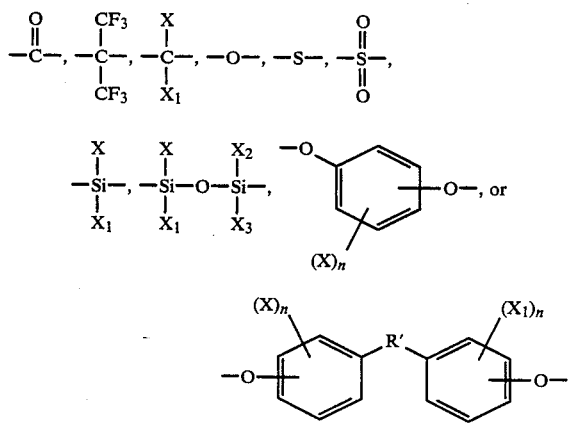

where n=0 to 4 or alkylene radicals of 1 to 3 carbon atoms, and where
r=15 to 95 mol %, preferably 15 to 90 mol %
t=5 to 85 mol %, preferably 10 to 85 mol %
s=100%

The multiple substitutions ortho to the amine functions in the above illustrated structures sterically restricts free rotation around the imide linkage. This causes the aromatic residue of the diamine function to be held out of the plane of the imide function and the aromatic residue of the dianhydride function. Electronic ring conjugation within the aromatic polyimide chain is, therefore, greatly reduced. Further, the beforementioned alkyl substituents sterically block strong electronic interactions between different polyimide chains within the membrane. It is believed that these structural considerations allow for a greater molecular free volume within the membranes of this invention which leads to the exceptionally high gas permeabilities found.

The incorporation of flexible units such as less rigid dianhydrides and/or —Ar'— for diamines allows for the partial relaxation of this rigidity which may lead to lowered molecular free volume in the polymer. This relaxation promotes greater selectivity for the permeation of certain gases from multicomponent gas mixtures through the membrane. At comparable gas selectivities, membranes of the polyimides disclosed herein have generally higher gas permeation rates than other polymers disclosed in the prior art. By varying the amount of relaxation in the polymers of this invention, membranes can be tailored for a wide range of gas separations with exceptional gas productivity.

Generally, prior art polyimide gas separation membrane materials suffer from low gas permeation rates, which is not desirable. It is believed that the low to moderate gas permeation rates found in the prior art is a direct consequence of the less rigid nature of the polyimide materials found therein. The lowered rigidity incorporated in such materials allows for closer packing of the polyimide chains and, in turn, lowers the molecular free volume. For example, polyimide membrane materials of the present invention have from 850 to 50 times the oxygen permeation rate found for polyimide membrane materials disclosed in U.S. Pat. No. 4,378,400. Similarly, the polyimide membrane materials of the present invention have from 43 to 12 times the oxygen permeation rate found for the polyetherimide membrane materials disclosed in U.S. Pat. No. 4,156,597. The polyimide materials taught in U.S. Pat. No. Re 30,351, U.S. Pat. Nos. 3,822,202, and U.S. Pat. No. 3,899,309 also suffer from moderate gas permeation rates. This is demonstrated by the herein incorporated Comparative Example, which is typical of the polyimide membrane materials disclosed therein.

As preferred examples, some of the fully cyclized polyimides of this invention are soluble in ordinary organic solvents. This is a great advantage for the ease of fabrication of industrially useful membranes. Further, the polyimides reported in this invention range from extremely soluble to insoluble. The soluble polyimides can be solution cast on porous solvent resistant substrates to serve as the dense separating layer of a composite membrane; or they can be solution cast as dense or asymmetric membranes. Insoluble examples can be cast into membranes from their polyamic acid form and subsequently chemically or thermally cyclized.

The polyimides described in this invention have high inherent thermal stabilities. They are generally stable to 400° C. in air or inert atmospheres. The glass transition temperatures of these polyimides are generally above 300° C. The high temperature characteristics of these polyimides can help to prevent the membrane compaction problems observed in other polymers at even moderate temperatures.

The polyimide membranes disclosed herein have found use in gas separations. The present invention finds use in the enrichment of oxygen and nitrogen from air for increased combustion or inerting systems, respectively; in recovery of hydrogen in refinery and ammonia plants; separation of carbon monoxide from hydrogen in syngas systems; and separation of carbon dioxide or hydrogen sulfide from hydrocarbons.

EXAMPLE 1

To a stirred solution of 2,4,6-trimethyl-1,3-phenylene diamine (11.3 g, 0.075 mol) and 4,4'-methylene-bis(3-chloro-2,6-diethyl)aniline (28.45 g, 0.075 mol) in N-methylpyrrolidone (300 ml) was added 1,2,4,5-benzenetetracarboxylic dianhydride (33.05 g, 0.1515 mol) under an inert atmosphere at room temperature. The resulting orange solution was stirred overnight at room temperature. A solution of acetic anhydride (61.25 g, 0.6 mol) and triethylamine (60.71 g, 0.6 mol) was added with rapid stirring at room temperature. The resulting reaction solution was precipitated in water and the resulting solid was washed with water and washed twice with methanol. After air-drying overnight, the solid was further dried in a vacuum oven (20 inches (0.51 m) mercury) at 120° C. for 3 hours and at 250° C. for 5 hours to yield 63.4 g product.

The polymer prepared above was found to be soluble in dichloromethane and N-methylpyrrolidone.

Differential Scanning Calorimetry (DSC) was performed on the above polymer using a Du Pont Thermal Analyzer Model 990-3 with cell model HCB1-S/N00523, Baseline scope=5.0 in a nitrogen atmosphere at a 10° C./minute progress rate. No transitions correlated to a Tg or Tm were observed up to 400° C.

Thermogravimetric Analysis (TGA) was performed on the above polymer using a Du Pont Thermogravimetric Analyzer Model 99-2 with Cell Model 951-5 in an air atmosphere at a 10.C/minute progress rate. A 10% weight loss was observed at 440° C. and a 50% weight loss was observed at 520° C.

Films of the polymer prepared above were prepared by pouring a 3% polymer solution (based on weight) in dichloromethane into a ring form (9.0 cm diameter) to the height of 0.16 cm resting on a glass plate at room temperature. The films were allowed to dry at room temperature and then soaked off the plate with water. The resulting films were dried in a vacuum oven (20 inches (0.51 m) mercury) at 70° C. for more than 6 hours.

A film, prepared as above which was 2.4 mils ($6 \times 10^{-5}$ m) thick, was tested for mixed gas oxygen/nitrogen (21/79, mole) permeabilities at 500 psig (3447 kPa), 25° C. The results are reported below:
O$_2$ Productivity: 3400 centiBarrer
O$_2$/N$_2$ Selectivity: 3.7

A centiBarrer is the number of cubic centimeters of gas passed by the membrane at standard temperature and pressure times the thickness of the membrane in centimeters times $10^{-12}$ divided by the permeating area of the membrane in square centimeters times the time in the seconds times the partial pressure difference across the membrane in cm Hg, i.e., $$\text{centiBarrer} = 10^{-12} \frac{\text{cm}^3 \ (STP) \ \text{cm}}{\text{cm}^2 \ \text{sec} \ \text{cmHg}}$$

EXAMPLE 2

To a stirred solution of 2,3,5,6-tetramethyl-1,4-phenylene diamine (14.78 g, 0.09 mol) and 4,4'-methylenebis(2,6-diisopropyl)aniline (3.67 g, 0.01 mol) in dimethylsulfoxide (300 ml) was added 5,5'-[2,2,2-trifluoro-1-(trifluoromethyl)ethylidene]bis-1,3-isobenzofurandione (45.29 g, 0.102 mol) under an inert atmosphere at room temperature. The resulting viscous reaction solution was stirred overnight at room temperature. A solution of acetic anhydride (40.84 g, 0.40 mol) and triethylamine (40.48 g, 0.40 mol) was then added with rapid stirring at room temperature. The resulting reaction solution was stirred for 2.5 hours at room temperature and was then precipitated in water. The resulting solid was collected and washed twice with water, washed twice with methanol and allowed to air dry overnight. The solid was further dried in a vacuum oven (20 inches (0.51 m) mercury) at 120° C. for 4 hours and at 220° C. for 3 hours to yield 61.4 g product.

5,5'-[2,2,2-trifluoro-1-(trifluoromethyl)ethylidene]bis-1,3-isobenzofurandione has the formula:

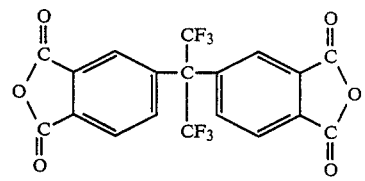

Films of the polymer prepared above were cast from a 15% polymer solution (based on weight) in N-methylpyrrolidone onto a glass plate treated with Du Pont TEFLON ® dry lubricant at 100° C.±2° C. with a 15 mil ($38.4 \times 10^{-5}$ m) knife gap. After drying on the plate at 100° C.±2° C. for 0.5 hour, the films were further dried in a vacuum oven (20 inches (0.51 m) mercury) at room temperature overnight. The films were stripped off the plate and dried in a vacuum oven (20 inches (0.51 m) mercury) at 120° C. for 4 hours. The films were tough and flexible and could be creased without cracking.

Du Pont TEFLON ® dry lubricant contains a fluorocarbon telomer which reduces the adhesion of the membrane to the glass plate.

A film, prepared as above which was 0.70 mils ($1.78 \times 10^{-5}$ m) thick, was tested for mixed gas oxygen/nitrogen (21/79, mole) permeabilities at 94.2 psig (650 kPa), 24.4° C. The results are reported below:
O$_2$ Productivity: 8190 centiBarrer
O$_2$/N$_2$ Selectivity: 3.4

A film prepared as above which was 0.75 mils thick, was tested for pure gas nitrogen, helium, and carbon dioxide permeabilities at 500 psig, 200 psig, and 200 psig, respectively, 24° C.±1° C. The results are reported below:
He Productivity: 42,610 centiBarrer
He/N$_2$ Selectivity: 11
CO$_2$ Productivity: 61,810 centiBarrer
CO$_2$/N$_2$ Selectivity: 16

COMPARATIVE EXAMPLE

To a stirred solution of 1,5-naphthalene diamine (31.6 g, 0.2 mol) in N,N'-dimethylacetamide (400 ml) was portionwise added 5,5'-[2,2,2-trifluoro-1-(trifluoromethyl)ethylidene]-bis-1,3-isobenzofurandione (88.9 g, 0.2 mol) under an inert atmosphere at room temperature. The reaction solution was heated to 67° C. and stirred for 1 hour. A solution of acetic anhydride (82 g) and triethylamine (82 g) was added to the rapidly stirring reaction solution. After stirring 2 hours at room temperature, the viscous reaction solution was precipitated in methanol. The resulting off-white solid was collected and dried in a vacuum oven (20 inches (0.51 m) mercury) for 1 hour at 150° C. and for 4 hours at 220° C.

Films of the above polyimide were cast from a 15% polymer solution (based on weight) in N-methylpyrrolidone onto a glass plate treated with Du Pont TEFLON ® dry lubricant at 60° C. with a 15 mil ($38 \times 10^{-5}$ m) knife gap. The films were dried on the plate at 60° C., cooled to room temperature and stripped off the plate. The films were further dried in a vacuum oven (20 inches (0.51 m) mercury) at room temperature overnight, at 100° C. for 3 hours and at 220° C. for 4 hours.

The films prepared above were tested for mixed gas $O_2/N_2$ (21/79, mole) permeabilities at 300 psig ($20.7 \times 10^5$ Pa), 25° C. The results are reported below:
$O_2$ Productivity: 560 centiBarrer
$O_2/N_2$ Selectivity: 4.8

EXAMPLE 3

To a stirred solution of

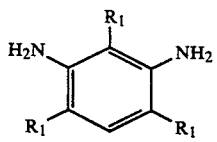

where two $R_1$'s are ethyl and one $R_1$ is methyl (7.12 g, 0.04 mol, a mixture of isomers from Ethyl Corporation) and 4,4'-methylene-bis(2-ethyl-6-methyl) aniline (45.12 g, 0.16 mol) in dimethyl sulfoxide (500 ml) was added 5,5'-[2,2,2-trifluoro-1-(trifluoromethyl)ethylidene]-bis-1,3-isobenzofurandione (44.84 g, 0.101 mol) and 3,3,,4,4'-bi-phenyltetracarboxylic dianhydride (29.71 g, 1.101 mol) under an inert atmosphere at room temperature. The resulting viscous reaction solution was stirred overnight at room temperature. A solution of acetic anhydride (81.67 g, 0.80 mol) and triethylamine (80.95 g, 0.80 mol) was added with rapid stirring at room temperature. After stirring for 1.5 hours, the reaction solution was precipitated in water. The resulting solid was collected and washed twice with water, washed twice with methanol and allowed to air dry overnight. The solid was further dried in a vacuum oven (20 inches (0.51 m) mercury) at 120° C. for hours and at 220° C. for 3 hours to yield 158.7 g product.

Films of the polymer prepared above were cast from a 15% polymer solution (based on weight) in N-methylpyrrolidone onto a glass plate treated with Du Pont TEFLON ® dry lubricant at 100° C.±2° C. with a 15 mil ($38.4 \times 10^{-1}$ m) knife gap. After drying on the plate at 100° C.±2° C. for 0.5 hour, the films were further dried in a vacuum oven (20 inches (0.51 m) mercury) at room temperature overnight. The films were stripped off the plate and dried in a vacuum oven (20 inches (0.51 m) mercury) at 120° C. for 4 hours. The films were tough and flexible and could be creased without cracking.

A film, prepared as above which was 1.35 mils ($3.4 \times 10^{-5}$ m) thick, was tested for mixed gas oxygen/nitrogen (21/79, mole) permeabilities at 486.2 psig (3352 kPa), 24.9.C. The results are reported below:
$O_2$ Productivity: 2340 centiBarrer
$O_2/N_2$ Selectivity: 4.3

A film, prepared as above which was 1.35 mils ($3.4 \times 10^{-5}$ m) thick was tested for mixed gas oxygen/nitrogen (21/79, mole) permeabilities at 97.6 psig (673 kPa), 25.4° C. The results are reported below:
$O_2$ Productivity: 2570 centiBarrer
$O_2/N_2$ Selectivity: 4.14

EXAMPLE 4

To a stirred solution of 2,4,6-trimethyl-1,3-phenylene diamine (18.03 g, 0.12 mol), 4,4'-methylene-bis(2-ethyl-6-methyl)aniline (11.28 g, 0.04 mol) and 4,4'-methylene-bis(2,6-diethyl)aniline (12.40 g, 0.04 mol) in N-methylpyrrolidone (400 ml) was added 3,3',4,4'-benzophenonetetracarboxylic dianhydride (32.54 g, 0.101 mol) and 5,5'-[2,2,2-trifluoro-1 -(trifluoromethyl)-ethylidene]-bis-1,3-isobenzofurandione (44.84 g, 0.101 mol) under an inert atmosphere at room temperature. The resulting viscous reaction solution was stirred overnight at room temperature. A solution of acetic anhydride (81.68 g, 0.80 mol) and triethylamine (80.96 g, 0.80 mol) was added with rapid stirring at room temperature. After stirring for 3 hours, the resulting reaction solution was diluted with additional N-methylpyrrolidone and precipitated in water. The resulting solid was collected and washed twice with water, washed twice with methanol and allowed to air dry overnight. The solid was further dried in a vacuum oven (20 inches (0.51 m) mercury) at 120° C. for 4 hours and at 250° C. for 4 hours to yield 111.0 g product.

Films of the polymer prepared above were cast from a 15% polymer solution (based on weight) in N-methylpyrrolidone onto a glass plate treated with Du Pont TEFLON ® dry lubricant at 100° C.±2° C. with a 20 mil ($5 \times 10^{-4}$ m) knife gap. After drying on the plate at 100° C.±2° C. for 0.5 hour, films were further dried in a vacuum oven (20 inches (0.51 m) mercury) at room temperature overnight. The films were stripped off the plate and dried in a vacuum oven (20 inches (0.51 m) mercury) at 120° C. for 4 hours. The films were tough and flexible and could be creased without cracking.

A film, prepared as above which was 1.75 mils ($4.45 \times 10^{-5}$ m) thick, was tested for mixed gas oxygen/nitrogen (21/79, mole) permeabilities at 98.3 psig (678 kPa), 24.4° C. The results are reported below:
$O_2$ Productivity: 2680 centiBarrer
$O_2N_2$ Selectivity: 3.5

I claim:

1. A process for separating one or more gases from a mixture of gases comprising bringing said mixture of gases into contact with a gas separation membrane formed from an aromatic copolyimide consisting essentially of repeating units of the formula:

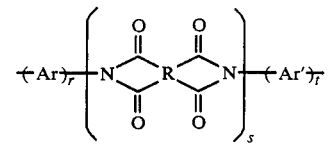

where —Ar— is

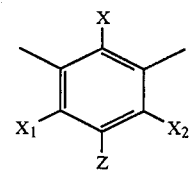

or mixtures thereof, —Ar'— is

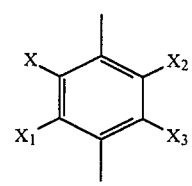

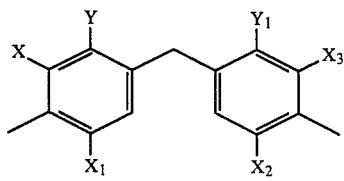

or mixtures thereof, is

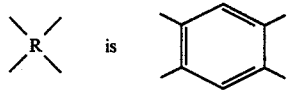 is 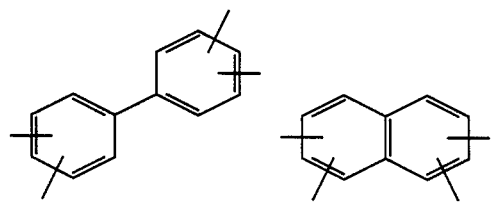

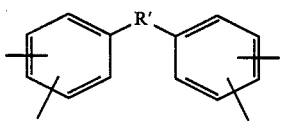

or mixtures thereof —X, —X₁, —X₂ and —X₃ are independently primary or secondary alkyl groups having 1 to 6 carbon atoms,
- —Z is —H, —X₁, —X₂, or —X₃
- —Y and —Y₁ are independently —H, —X, —X₁, —X₂, —X₃ or halogen
- and —R'— is

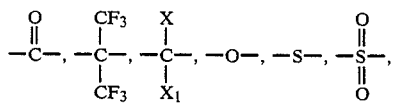

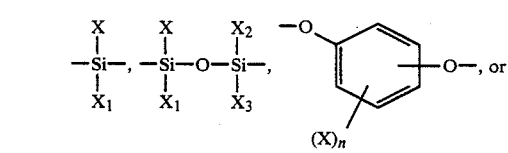

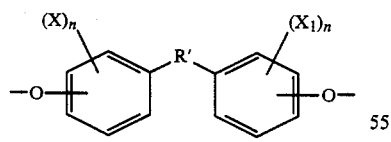

where n=0 to 4
or alkylene radicals of 1 to 3 carbon atoms, and where
r=15 to 95 mol %,
t=5 to 85 mol %,
s=100%.

2. The process of claim 1 where

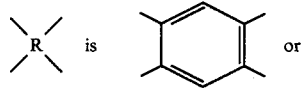 is  or

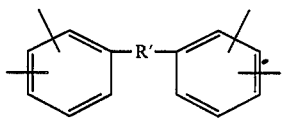

3. The process of claim 2 wherein —R'— is

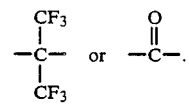

4. The process of claim 9 where r=15 to 90 mol % and t=10 to 85 mol %.

5. The process of claim 1 where —X, —X₁, —X₂ and —X₃ are —CH₃, or —CH(CH₃)₂.

6. The process of claim 1 where —Z, —Y, and —Y₁, are —H.

7. A gas separation membrane formed from an aromatic copolyimide consisting essentially of repeating units of the formula:

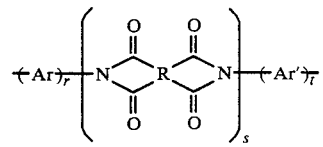

where —Ar— is

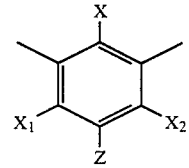

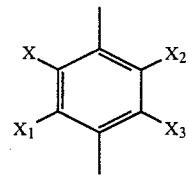

or mixtures thereof, —Ar'— is

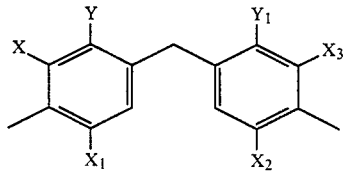

or mixtures thereof,

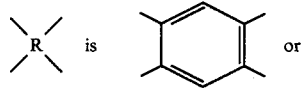 is 

-continued

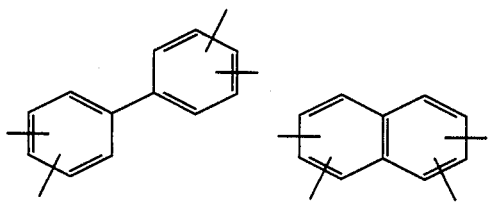

or mixtures thereof —X, —X₁, —X₂ and —X₃ are independently primary or secondary alkyl groups having 1 to 6 carbon atoms, —Z is —H, —X, —X₁, —X₂, or —X₃

—Y and —Y₁ are independently —H, —X, —X₁, —X₂, —X₃ or halogen and —R'— is

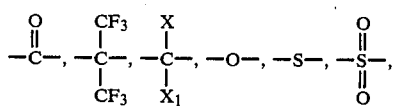

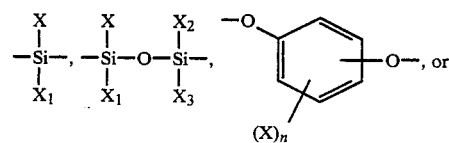

-continued

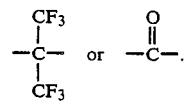

where n=0 to 4
or alkylene radicals of 1 to 3 carbon atoms, and where
r=15 to 95 mol %,
t=5 to 85 mol %,
s=100%.

8. The gas separation membrane of claim 7 where $\diagdown_R\diagup$  is  [benzene ring]  or

[diphenyl-R'-structure]

9. The gas separation membrane of claim 8 where —R'— is $-\underset{\underset{CF_3}{|}}{\overset{\overset{CF_3}{|}}{C}}-$ or $-\overset{O}{\underset{\|}{C}}-$.

10. The gas separation membrane of claim 9 where r=15 to 90 mole % and t=10 to 85 mol %.

11. The gas separation membrane of claim 10 where —X, —X₁, —X₂, and —X₃ are —CH₃, —C₂H₅ or —CH(CH₃)₂.

12. The gas separation membrane of claim 11 where —Z, —Y and —Y₁, are —H.

* * * * *

UNITED STATES PATENT AND TRADEMARK OFFICE
CERTIFICATE OF CORRECTION

PATENT NO. : 4,932,982
DATED : June 12, 1990
INVENTOR(S) : Richard A. Hayes

It is certified that error appears in the above—identified patent and that said Letters Patent is hereby corrected as shown below:

In claim 1, column 9, line 34, after "-H,", insert -- -X, --.

In claim 4, column 10, line 16, delete "claim 9" and substitute therefor "claim 3".

In claim 5, column 10, line 19, after "-CH$_3$,", insert -- -C2$^H$5 --.

Signed and Sealed this

Third Day of November, 1992

Attest:

DOUGLAS B. COMER

Attesting Officer

Acting Commissioner of Patents and Trademarks